(12) United States Patent
Gupta et al.

(10) Patent No.: US 9,020,124 B2
(45) Date of Patent: *Apr. 28, 2015

(54) SYSTEM AND METHOD FOR IMPLEMENTING DO-NOT-DISTURB DURING PLAYBACK OF MEDIA CONTENT

(71) Applicant: CenturyLink Intellectual Property LLC, Denver, CO (US)

(72) Inventors: Shekhar Gupta, Overland Park, KS (US); Curtis Tucker, Lees Summit, MO (US); Robert J. Morrill, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/199,239

(22) Filed: Mar. 6, 2014

(65) Prior Publication Data

US 2014/0247928 A1    Sep. 4, 2014

Related U.S. Application Data

(63) Continuation of application No. 12/163,234, filed on Jun. 27, 2008, now Pat. No. 8,693,663.

(51) Int. Cl.
*H04M 3/42* (2006.01)
*H04M 1/658* (2006.01)
*H04M 1/65* (2006.01)

(52) U.S. Cl.
CPC ............ *H04M 1/658* (2013.01); *H04M 1/6505* (2013.01); *H04M 3/42365* (2013.01)

(58) Field of Classification Search
USPC ......... 379/68, 76, 88.11–88.13, 88.16, 88.23, 379/201.02–201.05, 211.01, 211.02; 455/414.1, 41.1–41.3; 725/111
See application file for complete search history.

(56) References Cited

U.S. PATENT DOCUMENTS

| | | | |
|---|---|---|---|
| 8,340,263 | B2 | 12/2012 | Rondeau et al. |
| 8,693,663 | B2 | 4/2014 | Gupta et al. |
| 8,792,628 | B2 | 7/2014 | Rondeau et al. |
| 2004/0235461 | A1 | 11/2004 | Jackson et al. |
| 2005/0020249 | A1 | 1/2005 | Seo |
| 2005/0117730 | A1 | 6/2005 | Mullis et al. |
| 2006/0020993 | A1* | 1/2006 | Hannum et al. ............... 725/111 |
| 2006/0105800 | A1 | 5/2006 | Lee |
| 2006/0234711 | A1 | 10/2006 | McArdle |

(Continued)

OTHER PUBLICATIONS

U.S. Appl. No. 11/809,440; Final Rejection dated Nov. 29, 2011; 4 pages.

(Continued)

*Primary Examiner* — Md S Elahee
(74) *Attorney, Agent, or Firm* — Swanson & Bratschun, L.L.C.

(57) ABSTRACT

The disclosed embodiments include a system, method, and computer program product for implementing do-not-disturb feature during media content. For example, in one embodiment, a determination is made on whether to implement the do-not-disturb feature is implemented on at least one of a plurality of devices associated with a user during the playback of the media content based on user preferences, wherein the user preferences specify a type of media content that triggers the do-not-disturb feature. In response to the do-not-disturb feature being implemented, notification of an incoming communication is suspended during playback of the media content.

20 Claims, 7 Drawing Sheets

(56) References Cited

U.S. PATENT DOCUMENTS

| | | |
|---|---|---|
| 2007/0060137 A1 | 3/2007 | Yeatts et al. |
| 2007/0077920 A1* | 4/2007 | Weeks et al. ............... 455/414.1 |
| 2008/0013540 A1 | 1/2008 | Gast |
| 2008/0298575 A1 | 12/2008 | Rondeau et al. |
| 2009/0279683 A1 | 11/2009 | Gisby et al. |
| 2009/0323907 A1 | 12/2009 | Gupta et al. |
| 2013/0072165 A1 | 3/2013 | Rondeau et al. |
| 2014/0247932 A1 | 9/2014 | Gupta et al. |
| 2014/0308928 A1 | 10/2014 | Rondeau et al. |

OTHER PUBLICATIONS

U.S. Appl. No. 11/809,440; Final Rejection dated May 3, 2011; 16 pages.
U.S. Appl. No. 11/809,440; Issue Notification dated Dec. 5, 2012; 1 page.
U.S. Appl. No. 11/809,440; Non-Final Office Action dated Feb. 29, 2012; 15 pages.
U.S. Appl. No. 11/809,440; Non-Final Rejection dated Jun. 17, 2011; 16 pages.
U.S. Appl. No. 11/809,440; Non-Final Rejection dated Dec. 9, 2010; 16 pages.
U.S. Appl. No. 11/809,440; Notice of Allowance dated Aug. 17, 2012; 23 pages.
U.S. Appl. No. 12/163,234; Final Rejection dated Oct. 12, 2012; 13 pages.
U.S. Appl. No. 12/163,234; Final Rejection dated Sep. 15, 2011; 13 pages.
U.S. Appl. No. 12/163,234; Issue Notification dated Mar. 19, 2014; 1 page.
U.S. Appl. No. 12/163,234; Non-Final Rejection dated Mar. 29, 2011; 17 pages.
U.S. Appl. No. 12/163,234; Non-Final Rejection dated May 29, 2012; 13 pages.
U.S. Patent Application No. 12/163,234; Non-Final Rejection dated Jun. 6, 2013; 12 pages.
U.S. Appl. No. 12/163,234; Notice of Allowance dated Nov. 21, 2013; 15 pages.
U.S. Appl. No. 13/674,484; Issue Notification dated Jul. 9, 2014; 1 page.
U.S. Appl. No. 13/674,484; Non-Final Rejection dated Dec. 6, 2013; 14 pages.
U.S. Appl. No. 13/674,484; Notice of Allowance dated Mar. 25, 2014; 28 pages.
U.S. Appl. No. 14/199,026; Non-Final Rejection dated Aug. 15, 2014; 16 pages.
U.S. Appl. No. 14/314,546; Non-Final Rejection dated Nov. 24, 2014; 15 pages.
U.S. Appl. No. 14/199,026; Notice of Allowance dated Feb. 17, 2015; 13 pages.
U.S. Appl. No. 14/314,546; Notice of Allowance dated Dec. 17, 2014; 31 pages.

\* cited by examiner

SYSTEM AND METHOD FOR IMPLEMENTING DO-NOT-DISTURB DURING PLAYBACK OF MEDIA CONTENT

CROSS REFERENCE TO RELATED APPLICATION

This application is a Continuation application of U.S. patent application Ser. No. 12/163,234, filed Jun. 27, 2008, entitled: SYSTEM AND METHOD FOR INCREMENTAL DO-NOT DISTURB DURING PLAYBACK OF MEDIA CONTENT the entire teachings of which are incorporated herein.

BACKGROUND

The use of and development of communications has grown nearly exponentially in recent years. The growth is fueled by larger networks with more reliable protocols and better communications hardware available to service providers and consumers. Users have similarly grown to expect better communications from home, work, and on the go. For example, users now expect added features that provide greater functionality from traditional forms of communication and entertainment. The methods for implementing do-not-disturb (DND) features and leaving voice messages are still quite limited to traditional methods, configurations, and setups.

SUMMARY

The disclosed embodiments include a system, method, and computer program product for implementing do-not-disturb feature during media content. For example, in one embodiment, a determination is made on whether to implement the do-not-disturb feature is implemented on at least one of a plurality of devices associated with a user during the playback of the media content based on user preferences, wherein the user preferences specify a type of media content that triggers the do-not-disturb feature. In response to the do-not-disturb feature being implemented, notification of an incoming communication is suspended during playback of the media content.

Another embodiment includes a system for automatically activating a do-not-disturb feature for media content. The system may include a set-top box operable to receive a selection of the media content from a user. The set-top box may be further operable to transmit a command to implement the do-not-disturb feature during playback of the media content. The system may further include a communications management system in communication with the set-top box operable to route all incoming communications to a server for storage during playback of the media content in response to receiving the command.

Yet another embodiment includes a set-top box for implementing a do-not-disturb feature during playback of media content. The set-top box may include a processor for executing a set of instructions and a memory operable to store the set of instructions. The set of instructions may be configured to implement the do-not-disturb feature during playback of the media content in response to receiving a selection of media content from a user, intercept an incoming communication and send the incoming communication directly to voice mail during the playback.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Illustrative embodiments of the present invention provide a system and method for implementing a do-not-disturb feature while viewing media content. The media content is audio or visual content that may be displayed, broadcast or otherwise presented to the user. The media content may include live, streamed, real-time, recorded or other media types such as VOD, pay-per-view, movies, concerts, sporting events, slide shows, television programs, or other media content, The do-not-disturb feature is a feature or service in which one or more devices enter a do-not-disturb mode. The do-not-disturb mode is a state, status or configuration for one or more devices that prevents interruption by silencing ringing, paging or intercoms to a level established by the do-not-disturb feature or a user. In one example, the do-not-disturb feature may place a number of handsets in a do-not-disturb mode so that the handsets do not ring, vibrate or flash, or may do so at a less intrusive level.

The do-not-disturb feature may be implemented automatically or as selected by a user. The do-not-disturb feature may be implemented by a set-top box, personal computing devices or communications management system for one or more telephonic devices. The description, features, and services for each embodiment may also be applicable to all of the other embodiments. The embodiments may be implemented for telephonic devices which include plain old telephone service (POTS) telephones, voice over Internet Protocol (VoIP) telephones, wireless devices, and other communications devices, protocols, and systems. The wireless devices may include a cellular telephone, personal digital assistant, communications enabled MP3 player, or other similar wireless devices.

Figure 1:
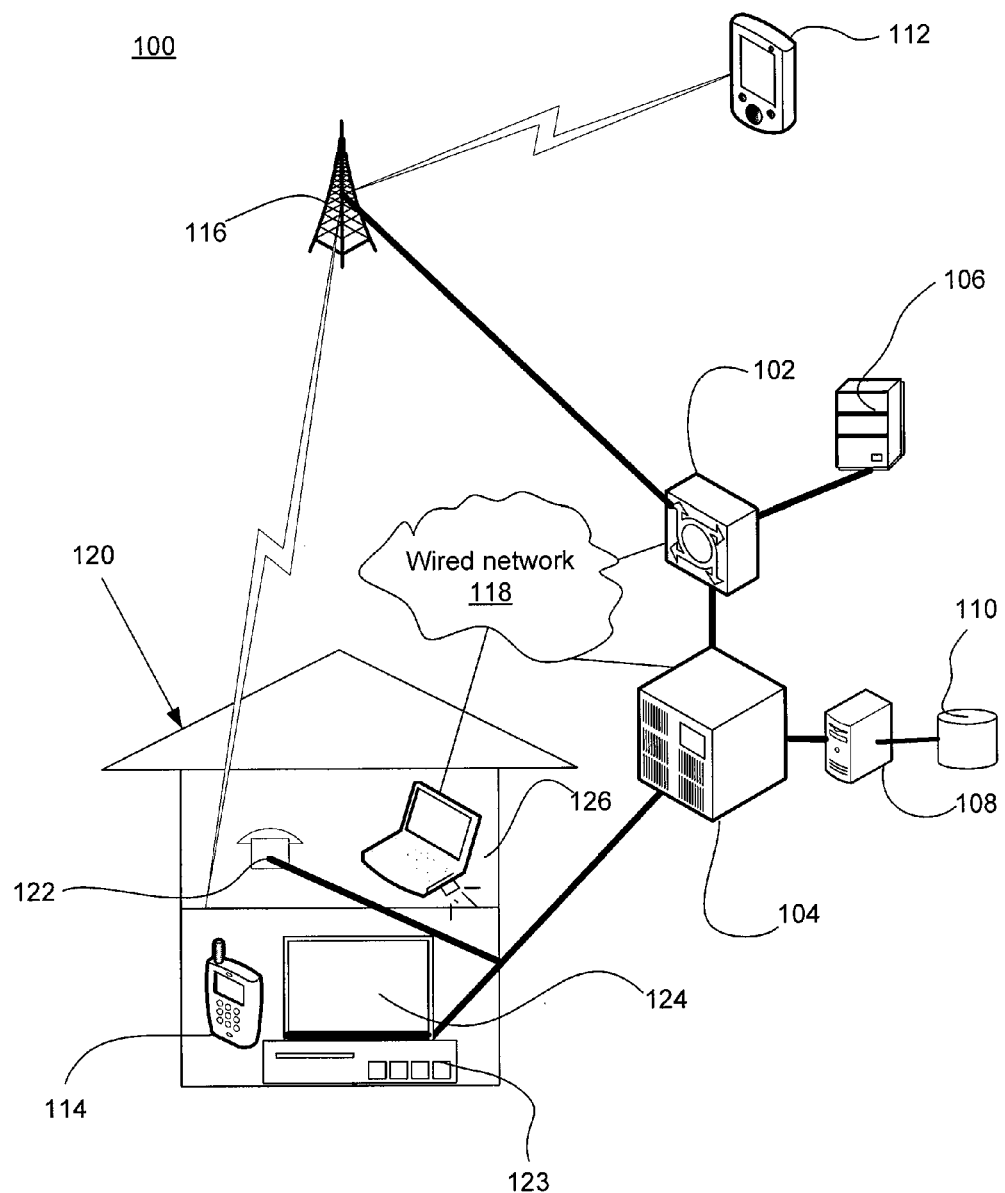
FIG. 1 is a pictorial representation of a communications system in accordance with an illustrative embodiment.

FIG. 1 is a pictorial representation of a communications system in accordance with an illustrative embodiment. The communication system 100 of FIG. 1 includes various elements used for wireless and wired communication. The communications system 100 includes a mobile switching center (MSC) 102, a local exchange 104, voicemail systems 106 and 108, a database 110, wireless devices 112 and 114, a transmission tower 116, a wired network 118, a home 120, home telephone 122, a set-top box 123, a television 124, and a client 126. The different elements and components of the communications system 100 may communicate using wireless communications, such as satellite connections, WiFi, WiMAX, CDMA wireless networks, and/or hardwired connections, such as fiber optics, T1, cable, DSL, high speed trunks, and telephone lines.

The wireless devices 112 and 114 may communicate with the transmission tower 116 using communications protocols, such as time division multiple access (TDMA), code division multiple access (CDMA), global systems for mobile (GSM) communications, personal communications systems (PCS), WiFi, WLAN, WiMAX, or other frequently used cellular and data communications protocols and standards. The wireless devices 112 and 114 may include cellular phones, Blackberry® devices, personal digital assistances (PDA), mp3 players, laptops, evolution data optimized (EDO) cards, multi-mode devices, and other wireless communication devices and elements.

Communications within the communications system 100 may occur on any number of networks which may include wireless networks, data or packet networks, cable networks, satellite networks, private networks, publicly switched telephone networks (PSTN), the wired network 118, or other types of communication networks. A communications network is the infrastructure for sending and receiving signals and messages according to one or more designated formats, standards, and protocols. The networks of the communications system 100 may represent a single communication service provider or multiple communications services providers. The features, services, and processes of the illustrative embodiments may be implemented by one or more elements of the communications system 100 independently or as a networked implementation.

In one embodiment, the MSC 102, voicemail systems 106 and 108, and transmission tower 116 are part of a wireless network that is operated by a wireless service provider. For example, the control signals and operational features may be performed by the MSC 102 and the wireless signals may be broadcast from the transmission tower 116 to the wireless devices 112 and 114. The wireless network may include any number of systems, towers, servers, and other network and communications devices for implementing the features and performing the methods herein described. The wireless network may enable cellular, data, radio, television service, or other wireless schemes. For example, the transmission tower 116 may transmit signals to cell phones, Blackberry® devices, car radios, and high definition televisions.

The MSC 102 may be a switch used for wireless call control and processing. The MSC 102 may also serve as a point of access to the local exchange 104. The MSC 102 is a telephone exchange that provides circuit switched calling and mobility management and may also provide GSM or PCS services to the wireless devices 112 and 114 located within the area the MSC 102 serves. The MSC 102 may include or communicate with a home location register (HLR) and visitor location register (VLR) that may be used to implement different features of the illustrative embodiments. The voicemail system 106 may be an integrated part of the MSC 102 or alternatively may be an externally connected device.

In one embodiment, the voicemail system 106 may include an integrated database for storing customer and usage information, electronic profiles, and data. In another embodiment, the voicemail system 106, a server, or other intelligent network device may store user preferences, applications, features, messages, and implementation logic, as further described herein. The user may communicate, interact, or send and receive data, information, and commands to the voicemail system 106 through the telephone 122, set-top box 123, television 124, wireless device 112 and 114, or the client 126. The MSC 102 and voicemail system 106 may include any number of hardware and software components. In one embodiment, the MSC 102 is an advanced intelligence network device with software modules equipped to perform a do-not-disturb feature.

The local exchange 104, the MSC 102, and/or other elements of the communications system 100 may communicate using a signal control protocol, such as a signaling system number 7 (SS7) protocol or TCP/IP protocols. The SS7 protocol or similar protocols are used in publicly switched networks for establishing connections between switches, performing out-of-band signaling in support of the call-establishment, billing, routing, and implementing information-exchange functions of a publicly switched network or the wired network 118. The local exchange 104 may be owned and operated by a local exchange carrier that provides plain old telephone service (POTS) to any number of users. In one embodiment, the local exchange 104 may be a class 5 switch that is part of the network systems of the local carrier. The local exchange 104 may include or may be connected to the voicemail system 106. However, the local exchange 104 may also be a Digital Subscriber Line Access Multiplexer (DSLAM), Internet Protocol (IP) gateway, base station, or any other suitable network access point.

The local exchange 104 may be a wire-line switch or public exchange using time domain multiplexing to provide telecommunications services to a particular subscriber or group of subscribers. The local exchange 104 may be located at a local telephone company's central office, or at a business location serving as a private branch exchange. The local exchange 104 may provide dial-tone, calling features, and additional digital and data services to subscribers, such as the home telephone 122. The local exchange 104 may also enable VoIP communication of the home telephone 122 through a data network. VoIP works by sending voice information in digital form, such as packets, rather than using the traditional circuit-committed protocols of the publicly switched network. The local exchange 104 may be or include a feature server, a call control agent, an IP gateway, and other devices or applications for implementing VoIP communications.

The communications system 100 may further include any number of hardware and software elements that may not be shown in the example of FIG. 1. For example, in order to facilitate VoIP communications, the communications system 100, and the MSC 102 and local exchange 104, in particular, may include additional application servers, media servers, service brokers, call agents, edge routers, gateways (signaling, trunking, access, sub, etc.), IP network service providers, adapters, exchanges, switches, users, and networks. The voicemail system 108 is similar to the voicemail system 106 except that it is equipped to handle voicemail for landline customers rather than wireless customers. The local exchange 104 or other components of a wire line network, such as a data, PSTN, VoIP, or other wired network may implement the features and perform the DND feature during playback of media content on the set-top box 123, television 124 or client 126, as herein described.

The MSC 102 and the local exchange 104 may include an authentication space. The authentication space may be a partition, module, or other storage or memory of the server designated by the communications service provider. The authentication space may validate that a user or device, such as client 126, is allowed to authorize the MSC 102, local exchange 104, servers, switches, network devices, or corresponding voicemail systems 106 and 108 to set preferences, implement changes, review information, or perform other updates. For example, a user may first be required to provide a secure identifier, such as a user name, password, or other authentication code or hardware interface, to verify the user is authorized to make changes to a media playback DND feature within the authentication space.

The authentication information may also be used to create a secure connection between the client 126 and the MSC 102, a server, or the local exchange 104. The secure connection may be a virtual private network tunnel, an encrypted connection, firewall, or other form of secured communications link. The MSC 102 and local exchange 104 may use any number of gateways, proxies, applications, or interfaces for allowing the client 126 to communicate with the MSC 102 and local exchange 104 through the wired network 118. Alternatively, the client 126 may use a wireless network or other network to access the MSC 102 and local exchange 104. The MSC 102 and local exchange 104 may use a host client application for communicating with numerous clients.

The home 120 is an example of a dwelling, residence, or location of a person or group that may utilize any number of communications services. The home 120 is shown as a residence in the illustrated example, however, the home 120 may also be an office, business, or other structure wired or otherwise suitably equipped to provide telephone, data, and other communication services to one or more customers. In one embodiment, the home 120 is equipped with multiple communication devices, including home telephone 122 and client 126. The home telephone 122 may be standard devices that provide dialing and voice conversation capabilities. Home telephone 122 may be integrated in any number of other devices or may be used in different forms. For example, the home telephone 122 may be part of a refrigerator or intercom system. In another embodiment, the home telephone 122 may be integrated with a personal computer, such as client 126.

The communications services accessible from the home telephone 122 may include POTS or VoIP telephone service. The home telephone 122 may be VoIP telephones or may be standard telephones that include a modem and/or VoIP adapters for enabling VoIP communications. A special dial tone, message, web alert, or other feedback may specify once or repeatedly that the home telephone 122 is implementing a particular feature. For example, the home telephone 122 may sound a double chirp when implementing the DND feature for incoming calls. The user may cancel use of any features by reentering a feature command or a cancellation command.

The client 126 may be a personal computer for performing and executing programs and instructing and accessing the wired network 118. However, the client 126 may be any computing device suitable for communicating with the wired network 118 through a network connection. The wired network 118 may be a fiber optic, cable, or telephone network or other wired network suitable for communication over a hard wired connection with the client 126. In one embodiment, the home 120 may include a wireless router, adapter, switch, hub, or other suitable interface that allows the client 126 to communicate with the wired network 118. Alternatively, the client 126 may communicate with the wired network 118 through a wireless connection. The set-top box 123 and the television 124 may also communicate through the wired network 118.

The set-top box 123 is a device that configures media content for display by the television 124. In one embodiment, the set-top box 123 may function as a receiver, a digital video recorder, and a personal video recorder for displaying any number of audio, video, or static media content through speakers, the television 124 or other interconnected devices. For example, the set-top box may process media signals from a satellite provider, cable provider, DSL connection, Internet Protocol television (IPTV) connection, or other connection types and/or providers. The display is a device for visually displaying and presenting media content. The display may include various forms of televisions, laptops, desktops, projectors, monitors, or other similar devices herein referred to as the television 124 for description of an embodiment.

In one embodiment, the do-not-disturb ("DND") feature may be activated for the telephonic devices of the home 120 based on a selection performed through the set-top box 123, the television 124, or a remote control in communication with the client 126, set-top box 123, television 124, and home telephone 122. The set-top box 123, MSC 102, and local exchange 104 may use a graphical user interface (GUI), such as website or program accessible from the client 126 in order to enter and receive input preferences for activating the DND feature.

In an illustrative embodiment, the user may provide user input regulating DND features, or otherwise make selections and communicate commands using devices, such as or similar to, wireless devices 112 and 114, home telephone 122, and client 126. At any time, a user may select to enable, order, initiate, configure, reconfigure, or otherwise activate the DND feature.

For example, the user may use a command that informs a function trigger of the set-top box to enable the DND feature through the MSC 102, local exchange 104, voicemail systems 106 and 108, wireless devices 112 and 114, home telephone 122, or client 126. In one embodiment, the DND feature may be activated based on a user viewing or selecting to view specified media content. For example, any time the user purchases and views video-on-demand (VOD), user preferences may specify that the DND feature be incrementally activated in time periods or segments during the time the VOD is being played to the user. For example, the VOD may be of a live even of indeterminate or adjustable length that may adjust the length of time the DND feature is active.

In another example, the user may submit a command to activate the DND feature by dialing *2 on the home telephone 122 and then entering a pass code, account code, password, pin number, or other identifier. In another embodiment, a user may activate the feature by dialing *79 on a separate wireless device. The command may also be a password, voice activated, time activated, preset by user selection, or any other suitable option, setting, command, or user input. In another embodiment, the various features may be implemented using tactile commands.

Figure 2:
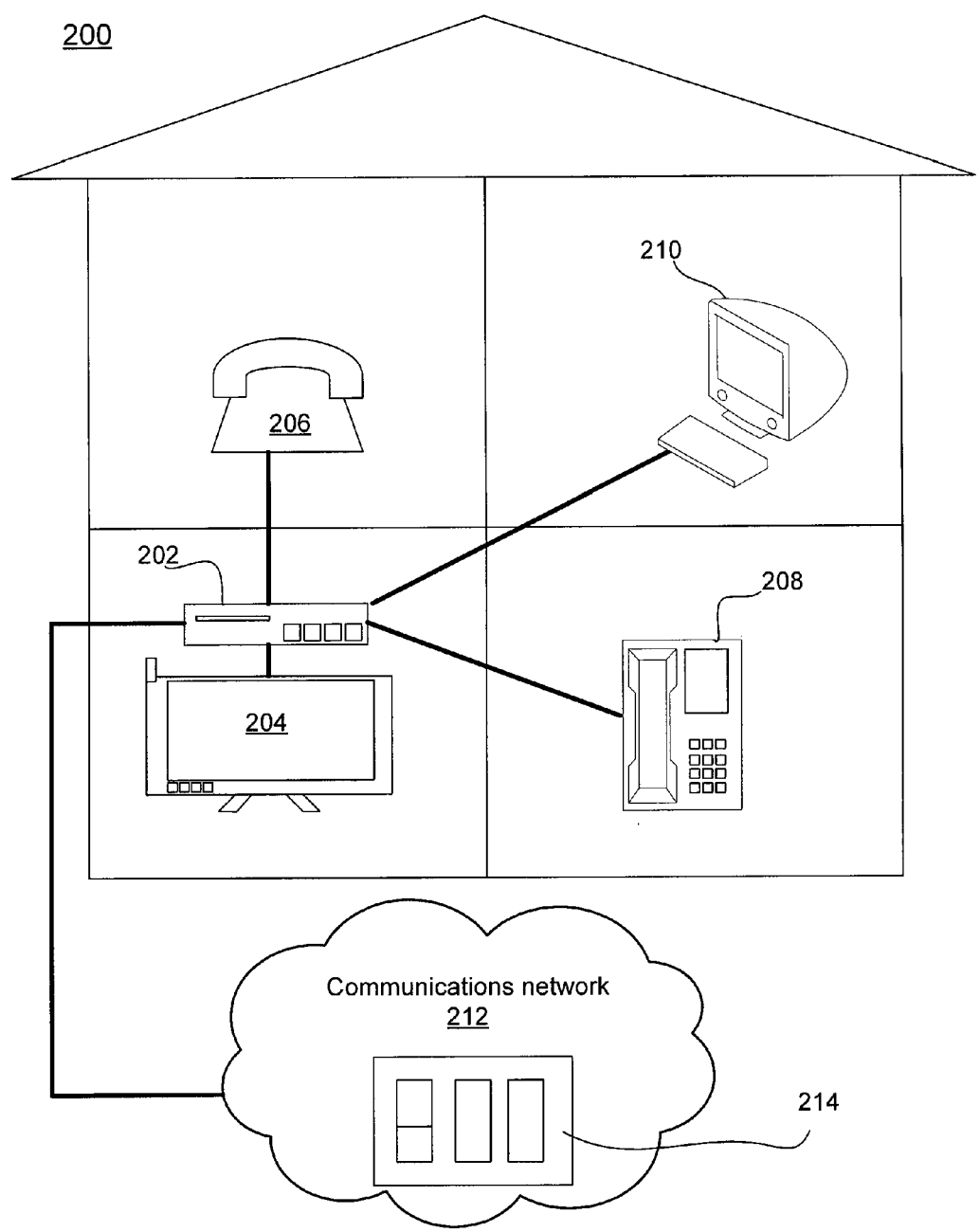
FIG. 2 is a pictorial representation of a user environment in accordance with an illustrative embodiment.

FIG. 2 is a pictorial representation of a user environment in accordance with an illustrative embodiment. FIG. 2 is one embodiment of a user environment 200. The user environment 200 of FIG. 2 may include a set-top box 202, a television 204, home telephones 206 and 208, a personal computer 210, and a communications network which may include a communications management system 214. The user environment 200 may be a home or business equipped with multiple personal computers, laptops, or tablet personal computers, and wireless and telephonic devices that may individually or collectively implement DND features, applications, and processes. The user environment 200 is a particular implementation of the home 120 of FIG. 1.

Figure 7:
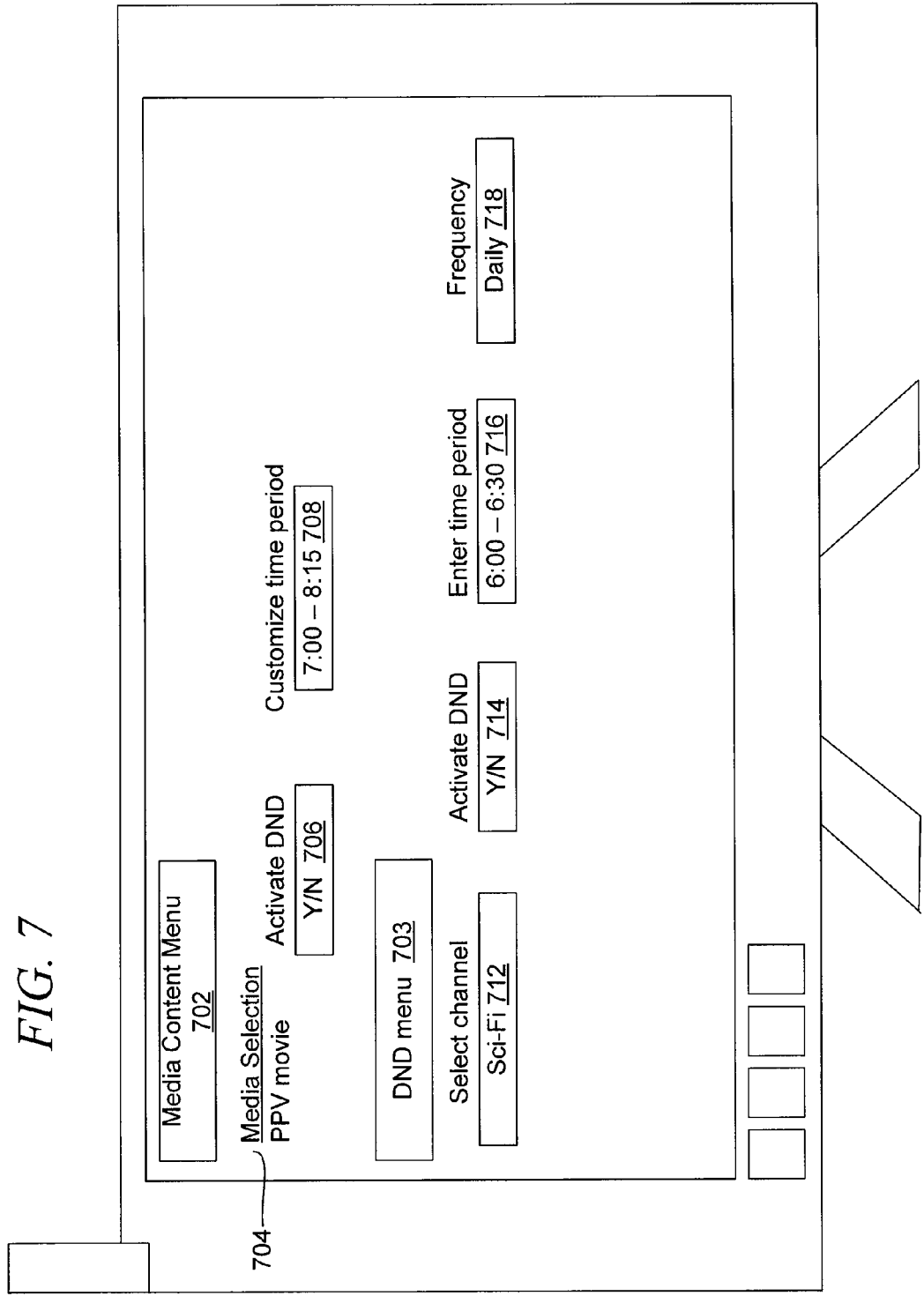
FIG. 7 is a pictorial representation of a user interface for activating and customizing a do-not-disturb setting in accordance with an illustrative embodiment.

The set-top box 202 is a device that enables the television 204 to become a user interface for media content. For example, the set-top box 202 may process digital or analog media content for display by the television 204, display Internet content, and record the media content for subsequent display by the television 204. In one embodiment, the set-top box 202 may provide a user interface to enable the DND through the television 204 as shown in FIG. 7. The set-top box 202 may communicate with a communications network 212 to enable the DND feature. In another embodiment, the set-top box 202 may enable the DND itself or through the use of the home computer 210 or a router. For example, the set-top box 202 or client 210 may manage or control a home or business network that may control a DND feature for interconnected devices.

The set-top box 202 communicates a signal to a display. The display is any electronic device configured to visually display information, data, and media content, such as a computer monitor, laptop, personal computer, wireless device, or television. In one embodiment, the display is the television 204 that is equipped to receive signals through any number of suitable mediums, including cable, satellite, IPTV, an antenna, or an analog connection. The television 204 and the set-top box 202 may communicate to create an interactive user interface as shown in FIG. 7.

In one embodiment, the user environment 200 is equipped with multiple telephonic devices, including home telephones 206 and 208. The home telephones 206 and 208 may be standard devices that provide dial tone, dialing, and voice conversation capabilities. Home telephone 206 may be integrated in any number of other devices or may be used in different forms. For example, the home telephone 208 may include an integrated answering machine. In another embodiment, the home telephone 206 may be integrated with a personal computer.

Any number of wireless devices may also operate within the user environment 200. For example, a cell phone may communicate with the set-top box 202 through a Bluetooth or WiFi connection. For example, the DND feature may be activated for one or more wireless devices that are detected or within a specified proximity to the set-top box 202. A user may configure which wireless devices within their home receive the DND feature. For example, the user preferences entered through the set-top box 202 may specify that the home telephones 206 and 208, as well as any wireless devices registered with the set-top box, enter a DND mode during display of a movie on the television 204. The wireless device of one or more residents of a home may be configured to enter a DND mode, as well as one or more of the home telephones 206 and 208, in response to the DND mode being activated for a specified time period. The wireless devices that enter the DND mode may be detected to be within the user environment 200 based on a network connection, radio frequency identification tag, global positioning system, or other location information.

The communication services accessible from the home telephones 206 and 208 may include POTS, WiFi, VoIP telephone service, or other types of telephone service. The home telephones 206 and 208 may be VoIP telephones or may be standard telephones that include a modem and/or VoIP adapters for enabling VoIP communications. The home telephones 206 and 208 may also be DECT (digitally enhanced cordless telephones), or WiFi enabled telephones.

The home telephones 206 and 208 may receive an instruction to enter the DND mode through a connection to the set-top box 202. The home telephones 206 and 208 may be linked to the set-top box through any number of suitable connections as described herein. In one embodiment, the set-top box 202 may send a packet, signal, command, or message to the other devices in the communications environment 200 to enter a DND mode for a specified period of time. In another embodiment, the personal computer 210 may include a program configured for controlling DND features and operations for all computing and communication devices in the user environment 200.

The communications network 212 may be comprised of equipment suitable for directing communications to a specified location or device. The communications network 212 may provide a wired or wireless connection to the various devices and elements of the communications environment 200.

The communications network 212 may include a communications management system 214. The communications management system 214 is one or more devices utilized to enable, initiate, route, and manage communications between one or more telephonic devices. The communications management system 214 may include one or more devices networked to manage the communications network 214. For example, the communications management system may include any number of servers, routers, switches, or advanced intelligent network devices that may implement the DND feature based on a signal, command, or message from the set-top box 202 or other device from the user environment 200. The communications network 212 sends and receives the electronic signals through any number of transmission mediums. The communications network 212 may include various fiber optics, cables, transmission towers, antennas, or other elements for transmitting voice communications to the connected telephonic devices. In one embodiment, the communications management system 214 and the communications network 212 work to transmit voice communications to the VoIP phones. However, the communications system 214 may enable POTS, wireless service, or other forms of voice communications.

In one embodiment, the DND feature may be activated to temporarily block incoming calls, emails, texts, chats, video messages, or any other form of incoming communication to devices or users in the user environment 200 based on established preferences. All blocked communications may be stored and delivered to the user when the specified DND period ends. The DND feature may be implemented by the set-top box 202, client 210, or the communications management system 214 automatically based on playback of media content or based on user input from any of the devices in the communications environment, a remote control, cell phone, or other electronic devices suitable to transmit a command.

Figure 3:
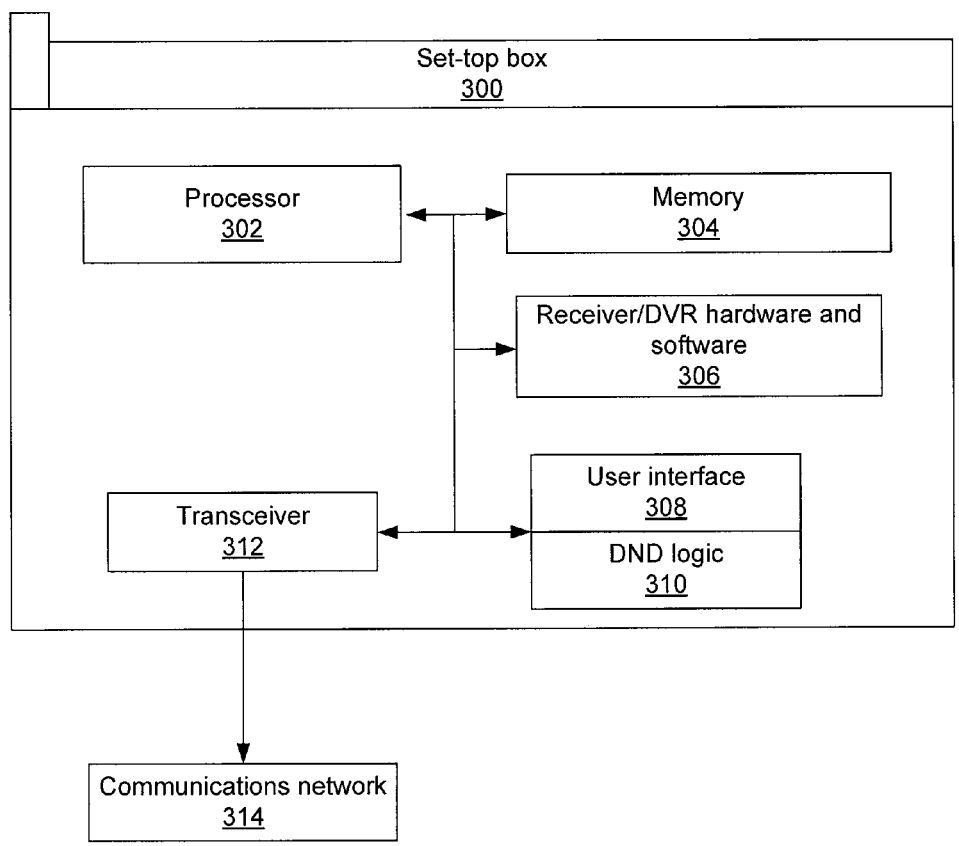
FIG. 3 is a block diagram of a set-top box in communication with a communications network in accordance with an illustrative embodiment.

FIG. 3 is a block diagram of a set-top box in communication with a communications network in accordance with an illustrative embodiment. The set-top box 300 may include a processor 302, memory 304, receiver/(digital video recorder) DVR hardware and software 306, a user interface 308, DND logic 310, and a transceiver 312 to communicate with a communications network 314. The elements of the set-top box 300 may communicate through any number of busses, cards, connectors, jumpers, or other connection elements. The components and description for the set-top box 300 may be similarly applicable to a client device, television, or network device operated by a communications service provider.

The processor 302 is circuitry or logic enabled to control execution of a set of instructions. The processor 302 may be a microprocessor, digital signal processor, central processing unit, or other device suitable for controlling an electronic device including one or more hardware and software elements, executing software, instructions, programs and applications, converting and processing signals and information, and performing other related tasks. The processor 302 may be a single chip or integrated with other computing or communications elements.

The memory 304 is a hardware element, device, or recording media configured to store data for subsequent retrieval or access at a later time. The memory 304 may be static or dynamic memory. The memory 304 may include a hard disk, random access memory, cache, removable media drive, mass storage, or configuration suitable as storage for data, instructions, and information. In one embodiment, the memory 304 and processor 302 may be integrated. The memory may use any type of volatile or non-volatile storage techniques and mediums. The memory 304 may store or queue communications or messages that are received during the period the DND feature is activated. For example, the memory 304 may store voice messages, email, and chat messages that are released for receipt and display through the interconnected television or other user devices when the DND feature is deactivated based on an event or at the end of a time period.

The receiver/DVR hardware and software 306 are the standard elements of the set-top box that manage the storage and playback of media content. The receiver/DVR hardware and software 306 may be configured through the user interface 308. The set-top box 300 may also include the user interface 308. The user interface 308 is an interactive menu for receiving user input. In one embodiment, the user interface 308 may be displayed onto a television or other display to allow a user to initiate the DND feature and configure user preferences for the DND feature. In another embodiment, the user interface 308 may control an interactive voice response system for presenting the user with various options and receiving user input.

The user interface may include DND logic 310. The DND logic 310 is the hardware and software that implements the DND feature for one or more telephonic devices. In particular, the DND logic may be configured to determine when media content is being played and when the DND feature is to be activated by the set-top box 300 or other devices in communication with the set-top box through the transceiver 312. For example, a user may record a sporting event and specify that the DND is automatically activated whenever the sporting event is displayed on the television. In one embodiment, the DND logic 310 prevents communications incoming into a home network from reaching specified devices by temporarily queuing or storing the messages. The incoming communications may be routed or rerouted through the set-top box before the communications may be processed or received by individual communications devices For example, the DND logic 310 may prevent one or more home telephones from ringing when the user is watching a specified religious program.

In another embodiment, the DND logic 310 may send DND commands, messages, or signals to the devices informing the devices to initiate and end the DND feature. The messages may be sent to individual devices or to a communications management system that manages communications for one or more of the user's devices. For example, a server that enables VoIP communications may prevent calls from being received by the home telephones until a command is received that the media playback has ended or been suspended. In one embodiment, the communications devices may enter a DND state until the end of a transmitted time period or until a secondary command is sent by the set-top box.

The set-top box 300 may include the transceiver 312. The transceiver is the device that enables the set-top box to transmit and receive commands, signals, information, messages, and other data through a wired or wireless connection. The transceiver 312 may utilize IP, SS7, Bluetooth, WiFi, or other signals, protocols, formats, or message types to communicate with other devices.

The communications network 314 may enable the set-top box 300 to receive media content and communicate with other devices to activate the DND feature. The media content received by the set-top box 300 may include television programs, VOD, real-time events, video clips, photographs, web pages, interactive content, or other media content. For example, a VLR and VoIP feature server that are part of the communications network 314 may activate a DND feature for a wireless device and VoIP phone during a political program that the user has designated for DND status.

Figure 4:
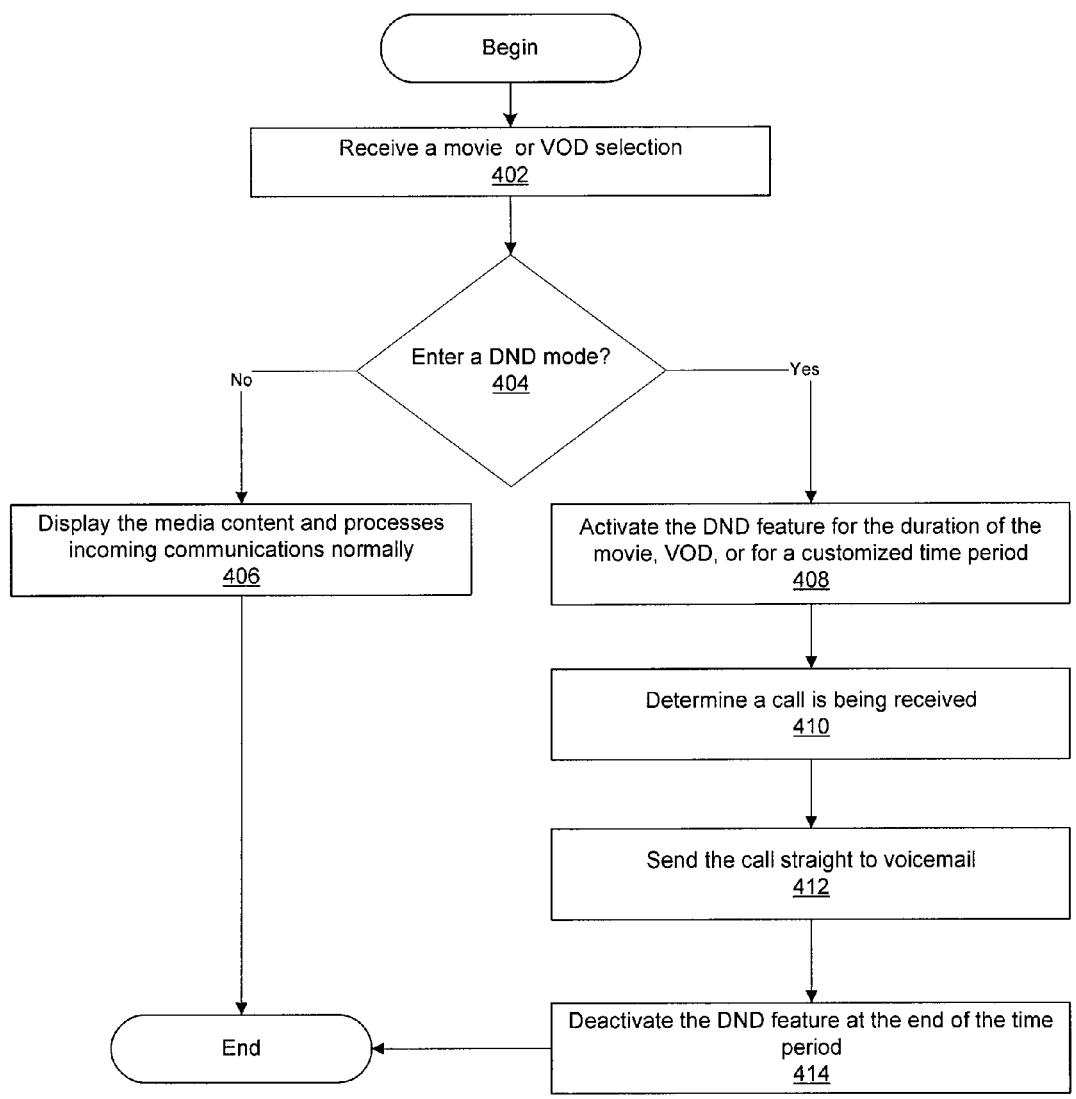
FIG. 4 is a flow chart of a process for activating a do-not-disturb feature in accordance with an illustrative embodiment.

FIG. 4 is a flow chart of a process for activating an do-not-disturb feature in accordance with an illustrative embodiment. The process of FIG. 4 may be implemented by a set-top box. In another embodiment, the process of FIG. 4 may be implemented by a communications management system operated by a communications service provider.

The process may begin by receiving a movie or video on demand selection (step 402). In another embodiment, the movie selection may also be the selection of a television show or other media content received through the set-top box or stored locally.

Next, the set-top box determines whether to enter DND mode (step 404). The determination of step 404 may be made based on user preferences and settings. For example, the user may have specified that VOD and real-time events automatically trigger the DND feature while the content is being displayed, but movies stored locally on the set-top box do not trigger the DND feature. In another embodiment, the set-top box may prompt a user to select whether to enter a DND mode during selection of the movie, VOD, or other media content. The set-top box may present a menu with numerous selections and choices for operating the DND feature. In another embodiment, the DND feature may be activated any time the user begins watching media content on a television, monitor, laptop, or other display to provide personal time for the user to relax.

If the set-top box determines not to enter the DND mode, the set-top box displays the media content and processes incoming communications normally (step 406). The incoming communications may include voice calls, as well as alternative formats, that may interrupt playback of the media content including email, chat, and text messages. Step 406 ensures that the user receives all incoming communications while viewing the applicable media content.

If the set-top box determines to enter the DND mode in step 404, the set-top box activates the DND feature for the duration of the movie, VOD, or for a customized time period (step 408). The set-top box may send a command, trigger, alert, or message to one or more other devices to implement the DND feature. In one embodiment, the message may be sent to a communications management system of a communications service provider that provides services to the user. As a result, all incoming communications or those communications specified by the user preferences are temporarily stored, queued, recorded, or otherwise temporarily suspended. In another embodiment, the set-top box may send a command signal to one or more VoIP phones, personal computer, wireless device, or other communication or computing device to suspend incoming communications from disturbing the user. For example, specified telephonic devices may be configured to not ring when incoming calls are received during the time period the DND feature is activated. In another embodiment, the set-top box may display a small pop-up message on the television indicating the type of call that is or was missed.

The time period of the DND may be based on the length of the media content to be played. The time period may also be fluid based on the amount of time it takes for the user to view the content. For example, the DND feature may be enabled until the set-top box, television, client, or applicable display becomes inactive, is turned off, or the media content is completely stopped. In another embodiment, the user may specify the time period. The time period may be specified utilizing a menu and may be increased or decreased by the user at any time.

Next, the set-top box determines a call is being received (step 410). In one embodiment, the communications and computing devices may share a network connection, and as a result, the set-top box may easily determine when a call is being received. In another embodiment, the applicable phone may send the set-top box an indicator that a call is being received.

Next, the set-top box sends the call directly to voicemail (step 412). During step 412, the set-top box may send or coordinate sending the call to voicemail or an answering machine or just prevent handsets from ringing. For example, the set-top box may change the destination of incoming packets associated with a call or reroute an incoming call stream.

The set-top box deactivates the DND feature at the end of the time period (step 414). The set-top box may implement deactivation of the DND feature or may send a command, signal, or information to another device to deactivate the DND feature or mode for affected devices. Messages received during the DND time period would be delivered to the user and processing calls and other incoming communications would return to normal. The set-top box may also be configured to display communications that were missed during the playback of the media content. As previously described, the time period may be automatically extracted from the media content, specified by a user, or determined from the user's actions. For example, if the user prematurely ends or pauses the media content, the set-top box may deactivate the DND feature. The user preferences may specify whether the DND feature ends if the user pauses playback, stops playback altogether, or takes other specified actions.

The default setting may be that the DND feature is active during the entire duration of the movie. The user may also lengthen or shorten this time period to suit their schedule. For example, a user may be expecting a business call before the movie will end so the time period is set to end a half an hour before the movie ends.

In one embodiment, the voicemail or answering machine may be configured to play a special message only used when the DND feature is active. For example, a user may configure an answering machine to inform callers when the user will be available to take their call.

Figure 5:
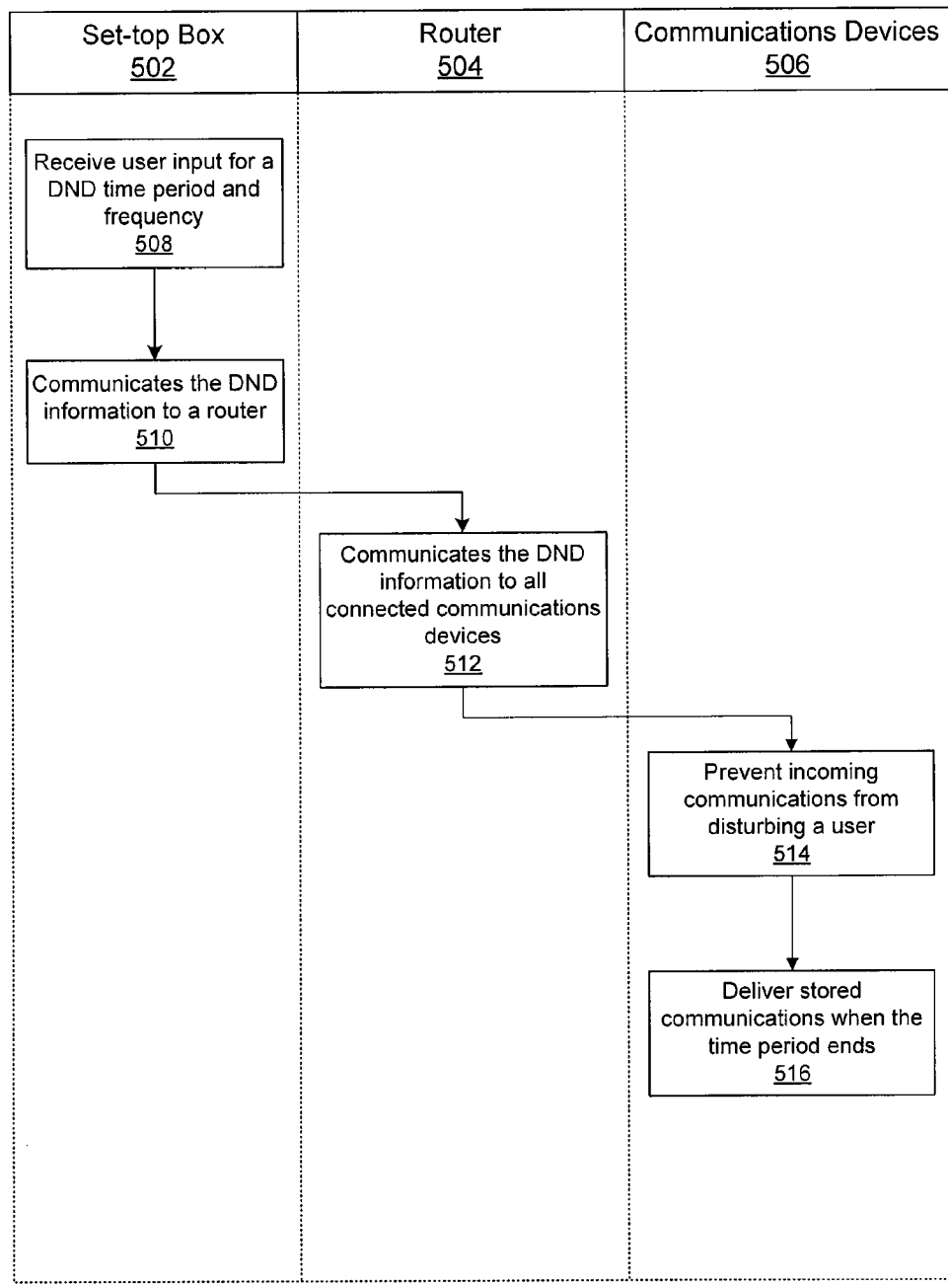
FIG. 5 is a flow chart of a process for a set-top box to activate a do-not-disturb feature in accordance with an illustrative embodiment.

FIG. 5 is a flow chart of a process for a set-top box to activate a do-not-disturb feature in accordance with an illustrative embodiment. The process of FIG. 5 may be implemented by a set-top box 502, a router 504, and communications devices 506. The process may begin with the set-top box 502 receiving user input for a DND time period and frequency (step 508). During step 508 the user may specify information for implementing the DND for media content as well as user preferences for the DND feature. The time period indicates the time period during which the DND feature remains active. The user input may also specify an interval, program, or frequency for which the DND feature is activated. For example, the set-top box 502 may automatically record a weekly program about painting. Anytime the painting program is selected for playback, the DND feature may be activated.

Next, the set-top box 502 communicates the DND information to a router 504 (step 510). The DND information may include the user input and preferences received in step 508. The DND information may specify the time period including a start time and a stop time for starting and stopping the DND feature.

The router 504 communicates the DND information to all connected communications devices 506 (step 512). The information may send a command or trigger to each of the communications devices 506 to enter a DND mode.

The communications devices 506 prevent incoming communications from disturbing a user (step 514). The communications devices 506 may go off-hook, queue messages, or route all incoming calls to voicemail during the time the DND feature is activated. The incoming communications may all be routed or stored in a single device or locally. Similarly, the DND feature may be implemented for each individual device or as a network through a single point of entry to a communications system or network. The communications devices 506 may turn off or deactivate all alert systems, ringers, or other interfaces so that the user is not disturbed while the media content is being played or displayed to the user.

Next, the communications devices 506 deliver stored communications when the time period ends (step 516). The stored communications may be displayed to a television by the set-top box 502 or each individual device may deliver the communications, such as a voicemail alert being displayed on a VoIP phone and email messages being delivered to a client device.

Figure 6:
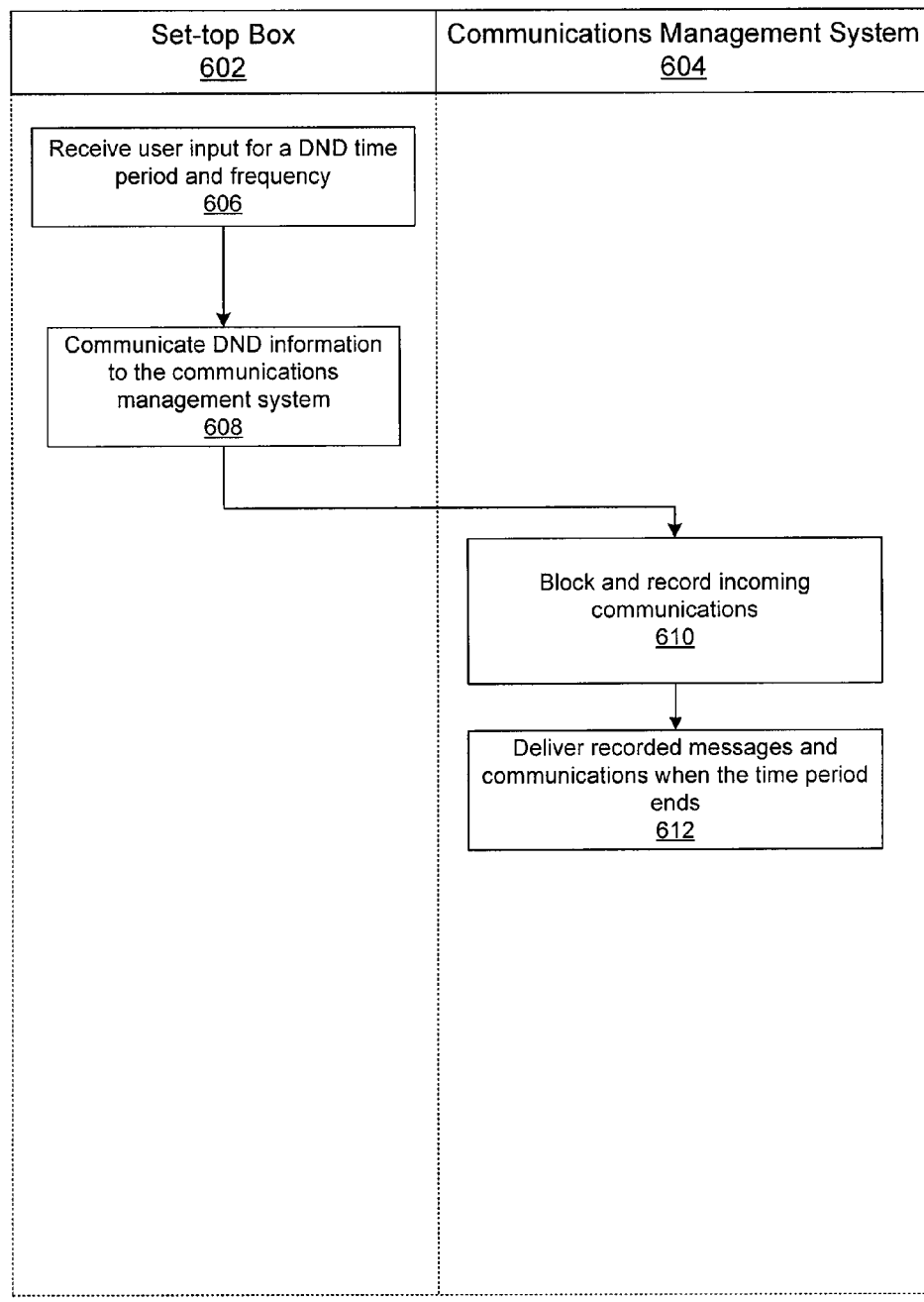
FIG. 6 is a flow chart of a process for a set-top box to activate a do-not-disturb feature in accordance with an illustrative embodiment.

FIG. 6 is a flow chart of a process for a set-top box to activate a do-not-disturb feature in accordance with an illustrative embodiment. The process of FIG. 6 may be implemented by a set-top box 602 and a communications management system 604. The process may begin with the set-top box 602 receiving user input for a DND time period and frequency (step 606). The user input and preferences received in step 602 may include the parameters and settings for implementing the DND feature in the form of DND information. The set-top box 602 communicates the DND information to a communications management system 604 (step 608). The DND information may include a command, time period, and other information for implementing the DND feature.

Next, the communications management system 604 blocks and records incoming communications (step 610). The incoming communications are blocked from reaching the user's communications devices in order to provide the user time to view the media content. One or more servers, routers, switches, or other devices of the communications management system 604 may implement step 610 and 612.

The communications management system 608 delivers recorded messages and communications when the time period ends (step 612). The messages and communications may be released based on the DND information. In another embodiment, user input may be provided at any time to end the time period and deliver any delayed or stored messages. The communications management system 604 may route the messages and communications to each individual device that was to receive them or to the set-top box to allow a user to access all messages conveniently.

FIG. 7 is a pictorial representation of a user interface for activating and customizing a do-not-disturb setting in accordance with an illustrative embodiment. FIG. 7 illustrates one embodiment of a user interface 700 that may include a media content menu 702, a DND menu 703, a media selection 704, and selection elements 706, 708, 712, 714, 716, and 718. In another embodiment, the user interface 700 may be played to a user utilizing an interactive voice response system. The user interface 700 may be generated and displayed by any number of devices including a set-top box, television, computer monitor, laptop, personal computer, wireless device, or VoIP phone. The user interface 700 may receive user input and user preferences for implementing the DND feature for a single event or for a series of events.

The media content menu 702 is a menu that presents various media options to the user. The media selection 704 may display what movies, television programs, VOD, pay-per-view event, or other media content has been ordered or selected for viewing. A user may then activate the DND feature through the selection element 706. In one embodiment, the user may use the selection element 706 to link the movie display with the DND feature. As a result, if that content is played, the DND feature may be automatically activated. Similarly, the user may choose not to activate the DND feature using the selection element 706 so that calls are processed normally.

The selection elements 706, 708, 712, 714, 716, and 718 may be icons, drop down menus, indicators, graphical identifiers, or other interactive or visual elements. The user may select or customize the DND time period by using selection element 708. The default setting may be configured so that the DND feature is active for the entire duration of the movie or program, but a user may lengthen or shorten the time period. For example, a user may order a sporting event through a VOD provider and specify the DND feature to be active for the duration of the event until the last ten minutes when they want to discuss the finish with a friend. The DND feature may be automatically put on standby if a user chooses to pause the playback of their media content and automatically be enabled once playback continues.

The DND menu 703 may include any number of other selection elements. The selection element 712 may allow a user to select a channel from channels available to the user through the applicable communications service provider. The user may choose to activate the DND feature when the selected channel or channels are being watched with selection element 714. The user may enter a time period for the DND feature to be active through selection element 716. The selection element 718 may allow a user to configure the frequency of the customized DND feature, such as daily, on weekends or weekdays, Wednesday only, or another custom frequency. For example, a family may watch a TV show together every Thursday night and the user may want to specify that every Thursday the DND feature is active when the family watches their show. The user may also use selection element 714 to select all channels or any time the viewer is watching media content so no matter what channel is viewed the family is not disturbed during the selected time interval. The user may also specify that the DND feature is only active when certain shows are being watched. In another embodiment, the user may not select any specified channel to associate the DND feature with only a time period and frequency.

In another embodiment, the user interface may include an option to allow certain phone numbers or communications from a specified individual to be received even when the DND feature is activated. For example, even though a user may activate the DND feature, the user may elect to receive communication from immediate family members selected from a network address book if received during the time period the DND feature is activated. In another embodiment, the user may specify a pass code, password, pin code, or other identifier that overrides the DND to allow a communication to be received by the applicable user device.

The previous detailed description is of a small number of embodiments for implementing the invention and is not intended to be limiting in scope. The following claims set forth a number of the embodiments of the invention disclosed with greater particularity.

What is claimed is:

1. A method for implementing a do-not-disturb feature during playback of media content, the method comprising:
    determining whether to implement the do-not-disturb feature on at least one of a plurality of devices associated with a user during the playback of the media content based on user preferences, wherein the user preferences specify that the do-not-disturb feature is triggered when a specified wireless phone of the plurality of devices is in proximity with a set top box playing the media content;
    receiving an incoming communication; and
    suspending notification of the incoming communication during playback of the media content in response to the do-not-disturb feature being implemented.

2. The method according to claim 1, further comprising:
    prompting a user to select whether to implement do-not-disturb during a selection of the media content.

3. The method according to claim 1, wherein the user preferences indicate whether to implement the do-not-disturb based on a classification of the media content.

4. The method according to claim 1, further comprising:
    displaying a message during the playback indicating information regarding the incoming communication in response to the user preferences allowing the message during the playback.

5. The method according to claim 3, wherein the classification of the media content is a video on demand media content, and wherein the do-not-disturb feature is implemented in response to the media content being a video on demand media content.

6. The method according to claim 1, further comprising:
    receiving user input specifying a duration of the playback for implementing the do-do-not-disturb during the duration, and wherein the do-not-disturb is automatically terminated when the playback ends, is stopped, or is paused.

7. The method according to claim 1, wherein implementing further comprises:
    sending a signal to a communications management system to automatically send the incoming communication to voicemail and prevent the incoming communication from being routed to an electronic device.

8. The method according to claim 1, wherein the incoming communications are any of a call, an email message, a text message, a chat message, and a video message.

9. The method according to claim 3, wherein the classification of the media content is a locally stored media content, and wherein the do-not-disturb feature is not implemented in response to the media content being a locally stored media content.

10. A system, comprising:
    at least one processor; and
    at least one memory coupled to the at least one processor and storing computer executable instructions for implementing a do-not-disturb feature during playback of media content, the computer executable instructions comprises instructions for:
        determining whether to implement the do-not-disturb feature on at least one of a plurality of devices associated with a user during the playback of the media content based on user preferences, wherein the user preferences specify that the do-not-disturb feature is triggered when a specified wireless phone of the plurality of devices is in proximity with a set top box playing the media content;
        receiving an incoming communication; and suspending notification of the incoming communication during playback of the media content in response to the do-not-disturb feature being implemented.

11. The system according to claim 10, wherein the computer executable instructions further comprises instructions for prompting a user to select whether to implement do-not-disturb during a selection of the media content.

12. The system according to claim 10, wherein the user preferences indicate whether to implement the do-not-disturb based on a classification of the media content.

13. The system according to claim 12, wherein the classification of the media content is a video on demand media content, and wherein the do-not-disturb feature is implemented in response to the media content being a video on demand media content.

14. The system according to claim 12, wherein the classification of the media content is a locally stored media content, and wherein the do-not-disturb feature is not implemented in response to the media content being a locally stored media content.

15. The system according to claim 10, wherein the computer executable instructions further comprises instructions for receiving user input specifying a duration of the playback for implementing the do-not-disturb during the duration, and wherein the do-not-disturb is automatically terminated when the playback ends, is stopped, or is paused.

16. The system according to claim 10, wherein implementing further comprises sending a signal to a communications management system to automatically send the incoming communication to voicemail and prevent the incoming communication from being routed to the at least one of the plurality of devices.

17. A non-transitory computer readable medium comprising computer executable instructions for implementing a do-not-disturb feature during playback of media content, the computer executable instructions when executed causes one or more machines to perform operations comprising:
　determining whether to implement the do-not-disturb feature on at least one of a plurality of devices associated with a user during the playback of the media content based on user preferences, wherein the user preferences specify that the do-not-disturb feature is triggered when a specified wireless phone of the plurality of devices is in proximity with a set top box playing the media content;
　receiving an incoming communication; and
　suspending notification of the incoming communication during playback of the media content in response to the do-not-disturb feature being implemented.

18. The non-transitory computer readable medium according to claim 17, wherein the user preferences indicate whether to implement the do-not-disturb based on a classification of the media content.

19. The non-transitory computer readable medium according to claim 18, wherein the classification of the media content is a video on demand media content, and wherein the do-not-disturb feature is implemented in response to the media content being a video on demand media content.

20. The non-transitory computer readable medium according to claim 18, wherein the classification of the media content is a locally stored media content, and wherein the do-not-disturb feature is not implemented in response to the media content being a locally stored media content.

* * * * *